May 1, 1928. 1,668,093
S. G. THOMSON
WHEEL STRUCTURE FOR VEHICLES
Filed April 16, 1926 7 Sheets-Sheet 1
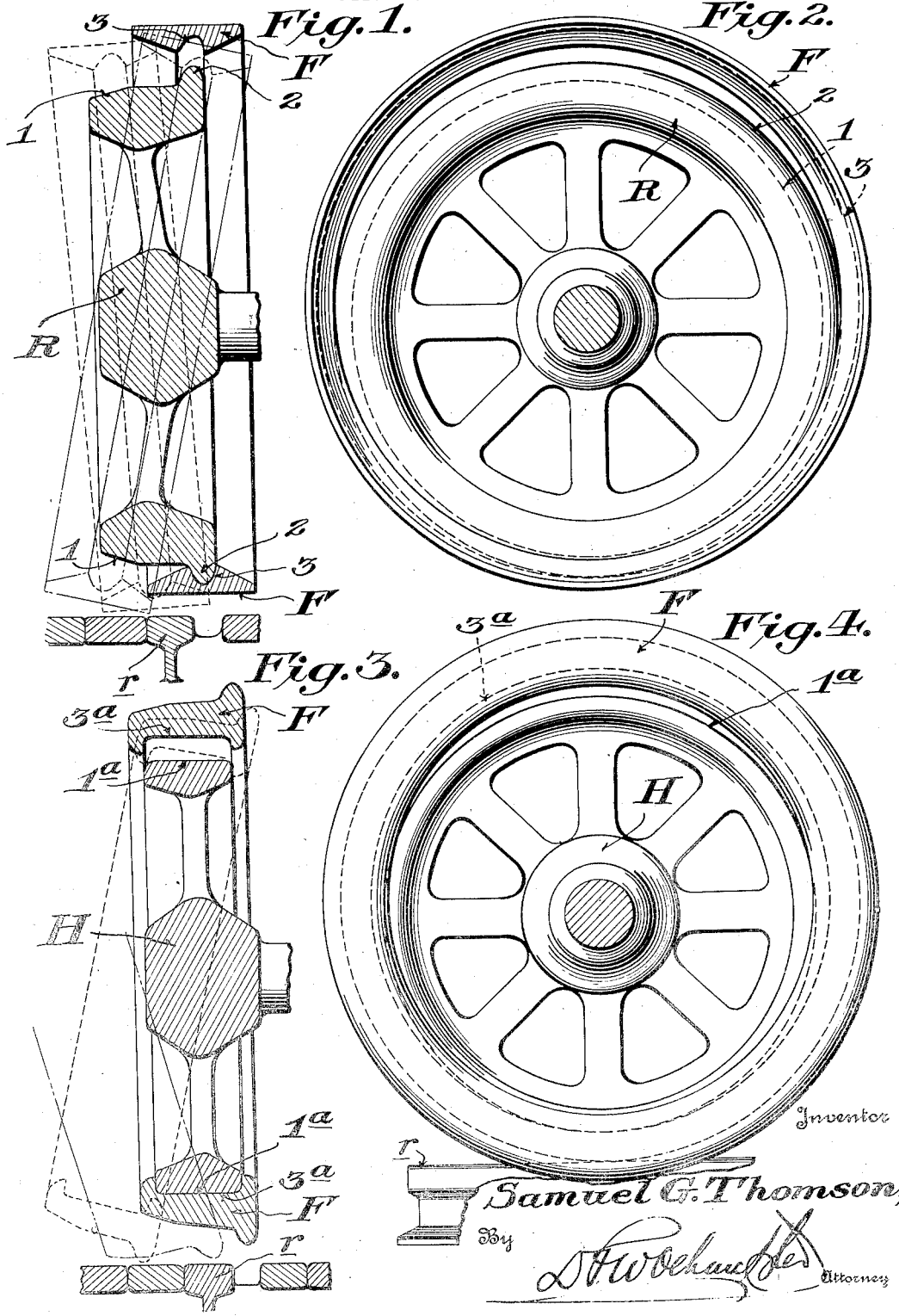

May 1, 1928.
S. G. THOMSON
1,668,093
WHEEL STRUCTURE FOR VEHICLES
Filed April 16, 1926
7 Sheets-Sheet 2
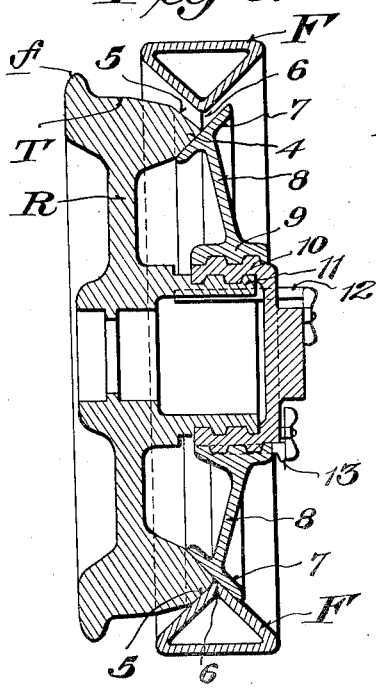
Fig. 5.
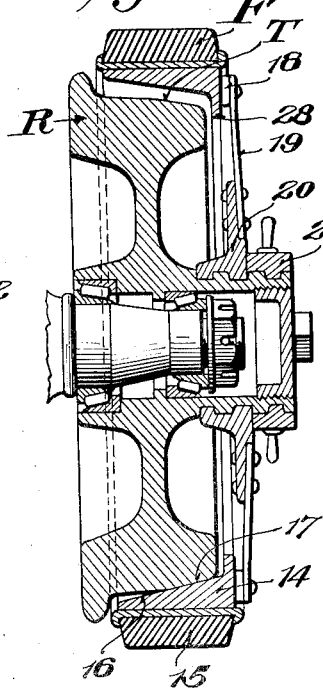
Fig. 6.
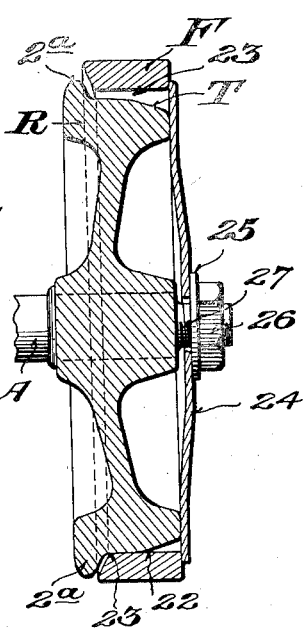
Fig. 7.
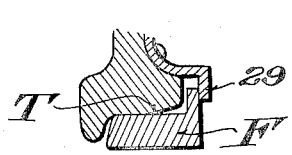
Fig. 8.
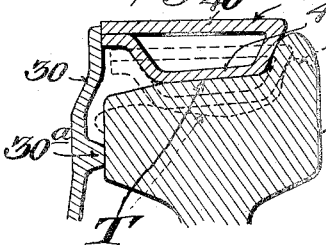
Fig. 9.
Fig. 11.
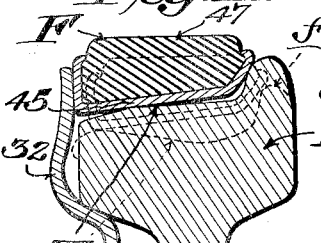
Fig. 13.
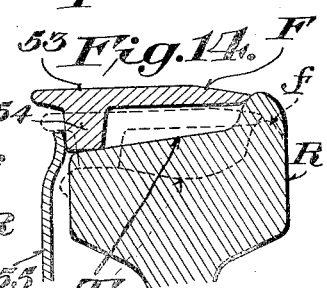
Fig. 12.
Fig. 14.
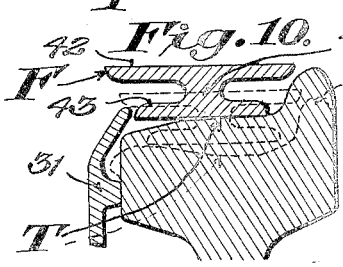
Fig. 10.
Inventor
Samuel G. Thomson,
By
Attorney

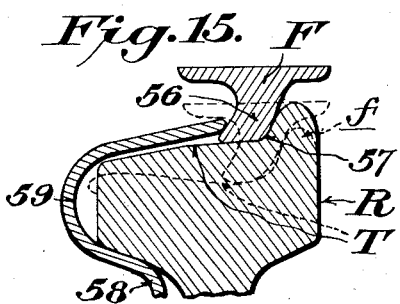
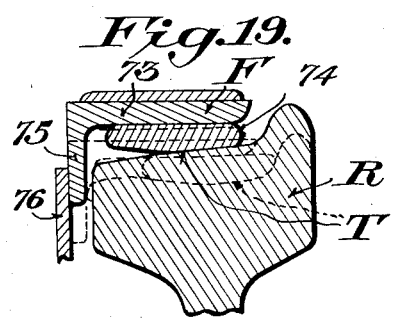
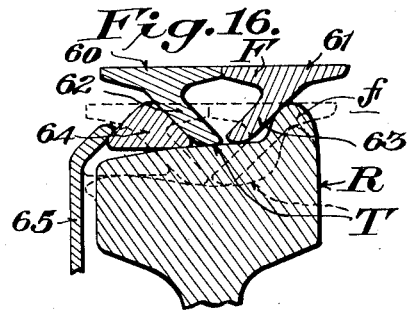
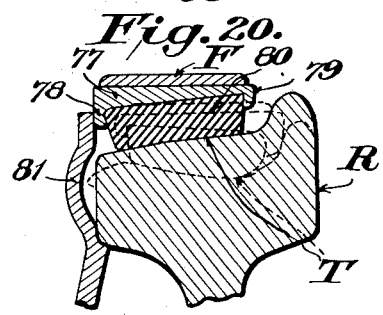
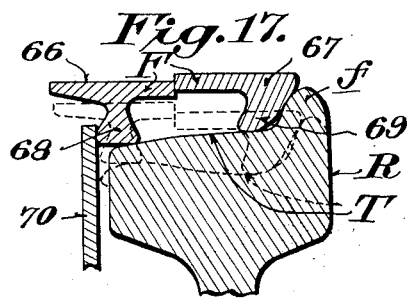
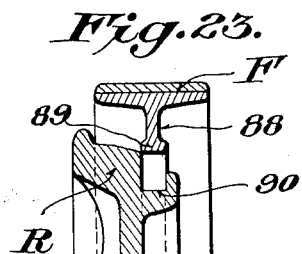
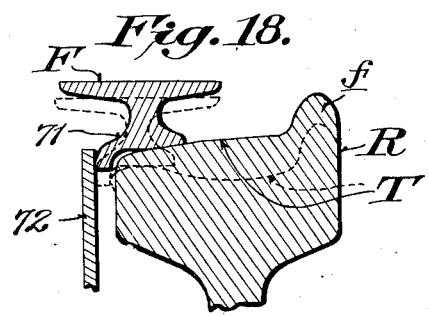
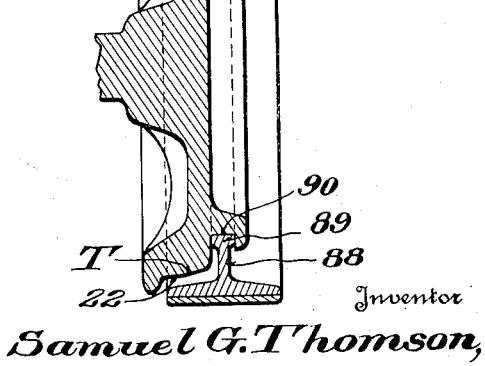

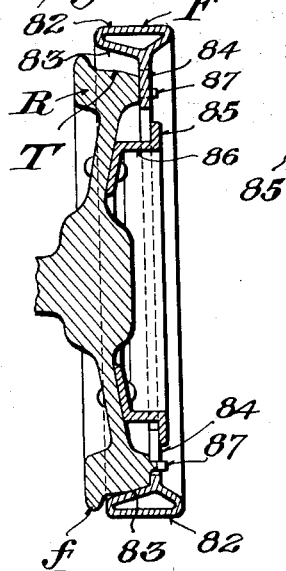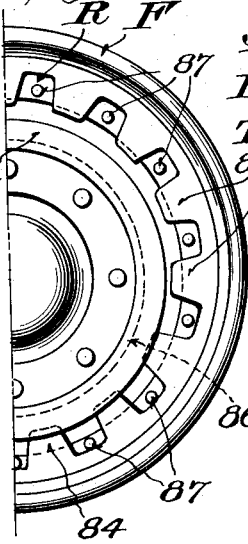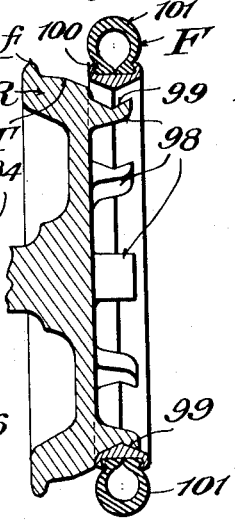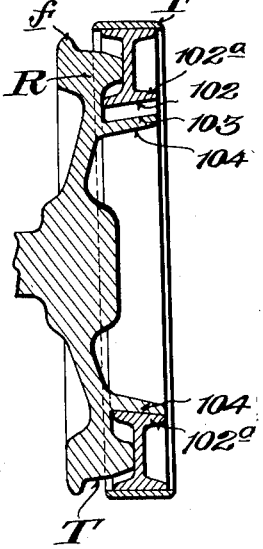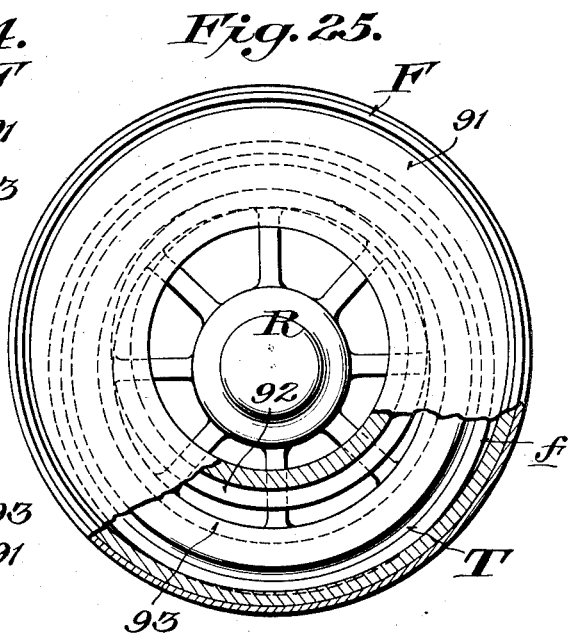

May 1, 1928.
S. G. THOMSON
1,668,093
WHEEL STRUCTURE FOR VEHICLES
Filed April 16, 1926
7 Sheets-Sheet 5
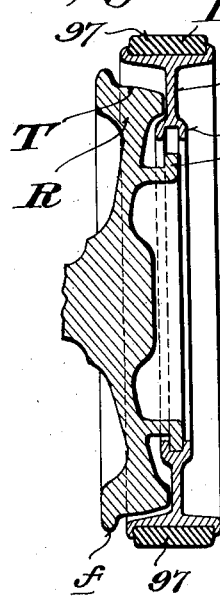
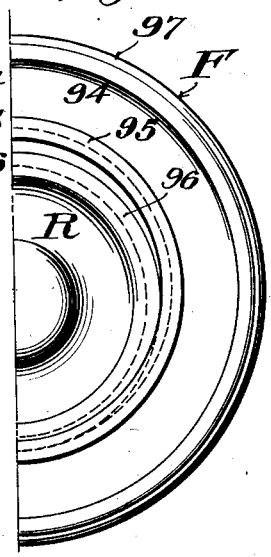
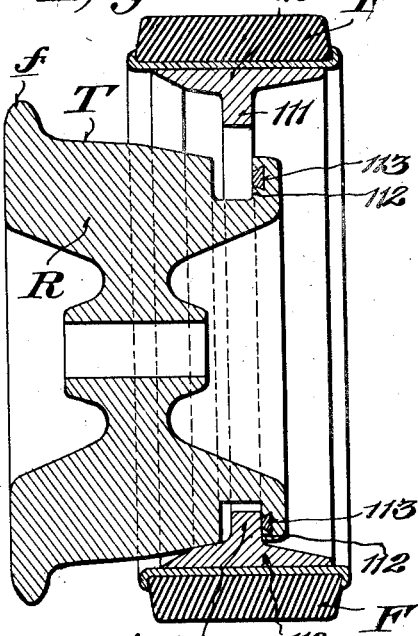
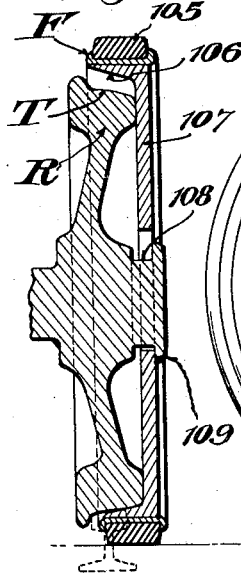
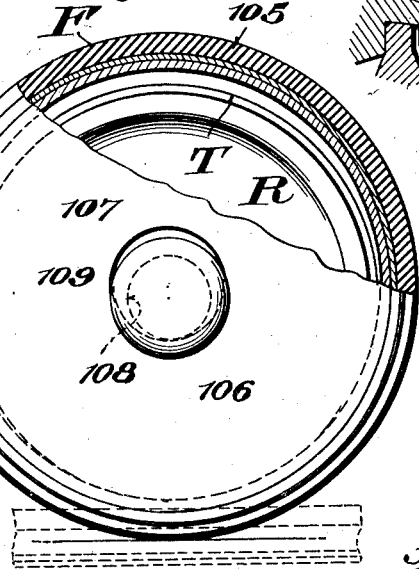
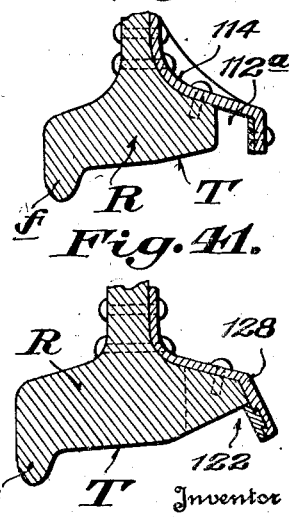
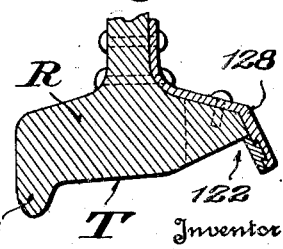
Inventor
Samuel G. Thomson,
By
Attorney
WITNESSES:

May 1, 1928.
S. G. THOMSON
1,668,093
WHEEL STRUCTURE FOR VEHICLES
Filed April 16, 1926      7 Sheets-Sheet 6
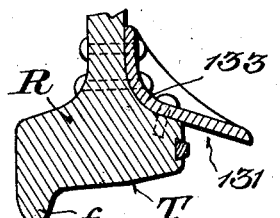
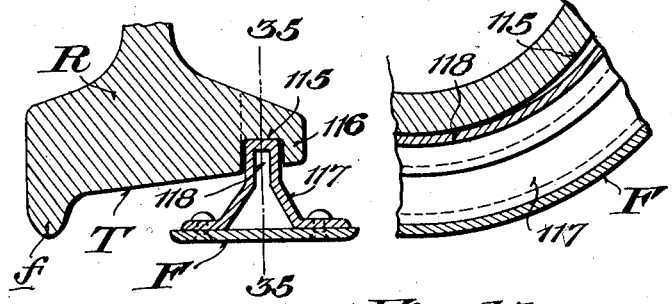
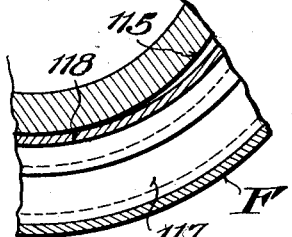
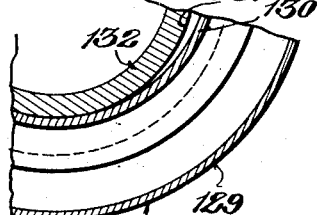
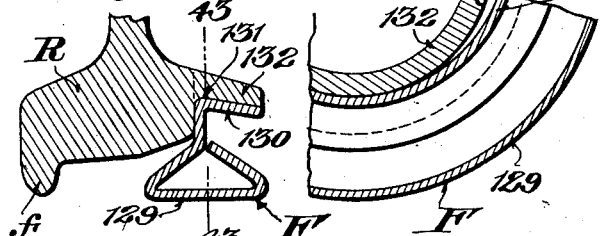
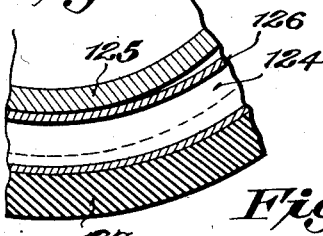
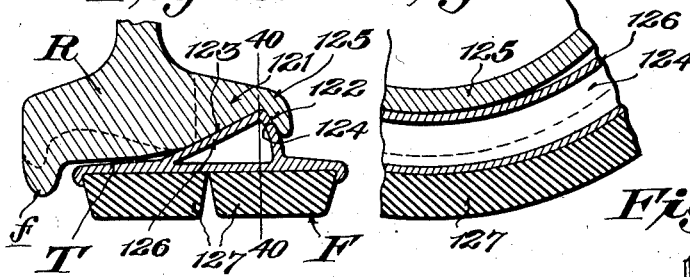
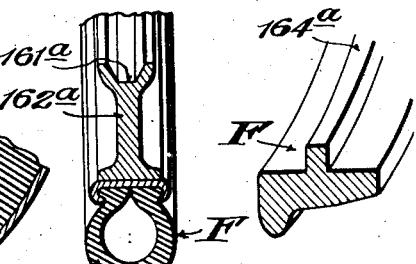
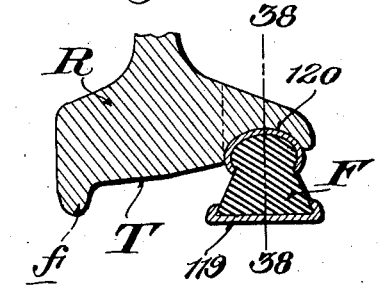
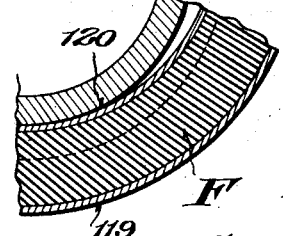
Inventor
Samuel G. Thomson,
by
Attorney

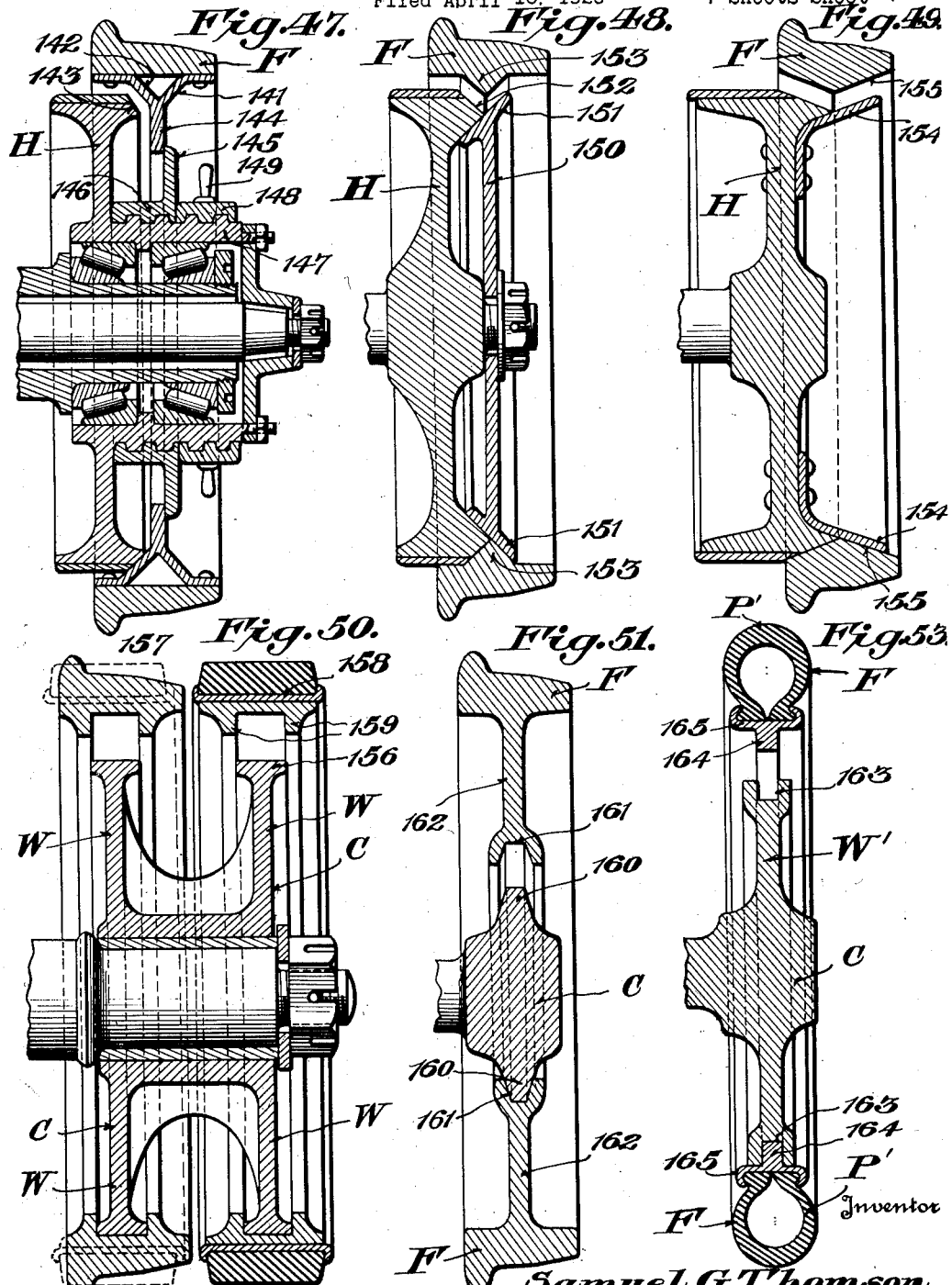

Patented May 1, 1928.

1,668,093

UNITED STATES PATENT OFFICE.

SAMUEL G. THOMSON, OF NEW YORK, N. Y.

WHEEL STRUCTURE FOR VEHICLES.

Application filed April 16, 1926. Serial No. 102,532.

This invention relates to vehicle wheel structures having interchangeable tires applicable either to a dual-functioning wheel to change the character of its tread, or to a vehicle wheel of the type in which a damaged tire may be removed and a sound one substituted, a primary object being to effect such a change with the greatest facility and with the exertion of the least effort.

Having in view such a wheel structure, one of the main objects of the invention is to equip a wheel with interchangeable treads or tires so constructed that the only work required to effect such interchange is to raise the wheel sufficiently to permit one tire to be slipped off and another on, and the wheel then dropped into operating position without necessitating the use of any fastening elements, such as clamps, bolts and the like.

Another object is to provide a wheel of this character having a floating tread member constructed and assembled to coact and revolve loosely around the wheel in connection with which it is used, which wheel may be equipped either with or without a tire, the wheel and floating tread member being for dual railway-highway service, one member being adapted to one service and the other member to the other service.

It is well known that a dual functioning vehicle can be operated over a railway track with much greater economy than over even the best built highway, and consequently, it is desirable that a wheel structure be so constructed that the vehicle can be speedily changed from rail to highway service and vice versa, so as to adapt it for use on traffic routes which include both railway tracks and highways, and so that the vehicle may thus be changed with facility as often during a day's work as the two kinds of service may require.

In a wheel having this dual function of railway track service and highway service, it is essential that a wide variety of designs and combinations of wheels having interchangeable treads be developed in order to embrace the many different kinds of wheels necessary for the various kinds of service.

In carrying out these objects, the invention is susceptible of a wide range of modification without departing from the spirit or sacrificing any of the advantages of the claimed invention; but for illustrative purposes there are shown in the drawings certain preferred and practical forms, in which:—

Figure 1 is a transverse section of a railway wheel with a floating highway tread shown mounted thereon in full lines, the dotted line positions of said tread representing the positions assumed during its application or removal.

Fig. 2 is a side elevation thereof.

Fig. 3 is a view similar to Fig. 1 showing a highway wheel with a floating railway tread.

Fig. 4 is a side elevation of the form shown in Fig. 3.

Fig. 5 is a transverse section of a railway wheel and a floating highway tread having a hollow triangular cross-section, which tread is held in its working position by a flanged cone and central clamping nut.

Fig. 6 is a view similar to Fig. 5, showing a modified form of highway member and clamping device, the hub of the wheel being mounted on roller bearings and wheel-pin of usual automotive construction.

Fig. 7 is a view similar to Fig. 6, showing a simplified form of the invention comprising a railway wheel mounted tightly on a revolving axle.

Fig. 8 is a detail transverse section showing still another method for providing a groove to confine the auxiliary tread.

Figs. 9 to 20 inclusive represent transverse sections of different forms of floating highway tread members in their various positions with relation to new and worn flanged railway track treads.

Fig. 21 is a transverse section of a railway track wheel showing in transverse section a hollow floating highway member held by the flange of a ring fastened to the web of the railway wheel.

Fig. 22 is a side elevation of a portion of the wheel embodying the form of invention illustrated in Fig. 21.

Fig. 23 is a transverse section of a railway track wheel having a floating highway tread mounted in a groove provided by an integral part of the railway wheel.

Fig. 24 is a view similar to Fig. 23, showing a highway tread member having a groove to co-act with a rib under the rim of the railway wheel. In this arrangement the load is transmitted from the highway wheel to the railway wheel at a point on the under side of the rim above the axle rather than on the outer tread of the railway wheel below the axle, as in forms heretofore shown.

Fig. 25 is a side elevation of the form shown in Fig. 24.

Figs. 26 and 27 represent a sectional view and a side elevation respectively showing a co-acting groove and rib arrangement similar to that illustrated in Fig. 23, except that in Figs. 26 and 27 the groove is provided by the floating highway tread member.

Fig. 28 is a view similar to Fig. 26, showing the floating highway member engaged by a plurality of integral projections from the railway wheel.

Fig. 29 is a view similar to Fig. 28, showing the railway wheel with an outwardly projecting flange to afford a slanting bearing face for the floating highway tread member, this slanting bearing causing the floating member to hug tightly against the rim of the railway wheel under load.

Fig. 30 is a transverse section showing a railway wheel with a groove around its hub, and a floating highway member having a deep flange or disc portion to engage this hub-groove.

Fig. 31 is a side elevation of the form shown in Fig. 30 with parts broken out and in section.

Fig. 32 is a transverse section of a wheel having a peripheral groove at the outer edge of the normal tread width, the floating tread member being thrust against the outer edge of this groove by the slanting tread of the wheel upon which the floating member takes its seat.

Fig. 33 is a detail transverse section of a railway wheel rim, the outer face of which forms the one side of a groove, the bottom and other side of which is formed by an attached ring or bracket.

Figs. 34 and 35 represent detail transverse and longitudinal sections showing a design in which the floating tread member runs freely and seats on the cylindrical bottom of a groove at the outer edge of the rim of the railway wheel.

Fig. 36 is a detail transverse section showing a modification of this groove which co-acts with the auxiliary tread member to hold it engaged with the wheel. The bottom of the groove shown in this figure affords a slanting or coned face to make the auxiliary member hug the inner side of the groove.

Figs. 37 and 38 are similar to Figs. 34 and 35, the groove in the railway wheel being here shown as having curved bottom and sides.

Figs. 39 and 40 represent views similar to those shown in Figs. 37 and 38 showing still another form of the groove in the railway rim and a wide double-tired floating member.

Fig. 41 is a detail transverse section showing the groove formed similarly to that shown in Fig. 33, except that in this design the shape of the groove is similar to that shown in Fig. 39.

Figs. 42 and 43 are a transverse section and a longitudinal section respectively showing an angular form of groove and a specially lightly constructed floating member.

Fig. 44 is a view similar to Fig. 41, except that in Fig. 44 the thrust of the floating tread under load will be away from the outer side of the groove instead of toward it as in Fig. 41.

Fig. 45 is a detail transverse section showing a grooved track wheel having a bearing for the floating auxiliary tread on a projecting flange at the outer side of the groove, this bearing having cross-ribs to engage grooves in the floating member in order to prevent relative slipping.

Fig. 46 is a detail longitudinal section of the form shown in Fig. 45.

Figs. 47, 48 and 49 are transverse sections of a highway wheel having a floating railway tread member mounted thereon and also shown in section, different forms of connection being employed in the various figures.

Fig. 50 is a transverse section of a wheel center having two webs on which are mounted floating tread members, one being here shown in the form of a railway tread and the other a highway tread.

Fig. 51 is a transverse section of a wheel center with a floating railway tread member mounted thereon.

Fig. 52 is a detail transverse section of a floating highway tread member such as would interchange with the floating railway tread member shown in Fig. 51.

Fig. 53 is a transverse section of a wheel center having a groove around its perimeter to engage a floating highway tread member which is interchangeable with the floating railway tread member shown in section in Fig. 54, and Fig. 54 is a detail perspective partly in section of a floating railway tread to be interchangeably used with the tread shown in Fig. 53.

Like reference numerals designate corresponding parts throughout the several figures of the drawings.

It is well known that in railway service, the treads of the wheels wear hollow and the top flanges sharp, as is indicated by the dotted lines in Figs. 9 to 20. Hence it is obvious that these treads which are changed by wear to various diameters and shapes, do not afford suitable bearing faces for an auxiliary member which depended on constantly maintained close-fitting co-acting faces. However, by the application of my invention, these tread faces may be used as shown to support or carry loose-fitting or floating auxiliary members, while in other designs illustrated, the floating member engages faces extending beyond the normal tread-width and thus outside of the region of wear; and in still other designs the floating member engages faces, grooves or ribs entirely separated and independent of the outer tread portion of the wheel rim.

This invention contemplates in the construction of a wheel for use on highways and railways respectively the provision of a wheel having a fixed tread, or a wheel center without a tread with which is designed to co-act a floating ring or auxiliary tire which co-acts and revolves loosely around the wheel or wheel center, the independently revolving member being held in operating position by interengaging elements which contact with each other for a part only of their circumferences.

In carrying this invention into effect, it is proposed to apply a floating auxiliary tread member designated generally as F to either a wheel R having a fixed railway tread as shown in Figs. 1 and 5 to 46; or to a wheel H having a fixed highway tread shown in Figs. 3, 47, 48 and 49; or to a wheel center C shown in Figs. 50 to 54. Various means are shown for mounting the wheels on the axle; but as these means do not involve the principles of the invention, it is not deemed necessary to describe them.

One of the distinctive features of the invention resides in the mounting on a wheel rim of a floating auxiliary tread of greater diameter than the wheel, whereby the co-acting bearing faces are of different diameters, and whereby the auxiliary or floating tread member contacts with the wheel at one point only, standing free for a greater portion of its circumference; so that, when in operation, the point of contact between the two members is continuously changing, and the auxiliary floating tread member moves independently of the wheel during rotation. This floating and loosely-engaging feature makes the exact working tread diameter and contour and the amount of tread and flange wear, of little or no importance in the operating relationship and relative positions of the railway tread and its co-acting highway tread member.

The various forms may be classified according to the mounting of the floating tread on the wheel or wheel center in connection with which it is used. In this respect, it will be noted in regard to the floating or auxiliary tread and the wheel or wheel center in connection with which it is used, that one has a keeper element preferably in the form of a groove or channel, while the other has a holding and guiding element preferably in the form of a projection, flange or rib to enter the channel. By these means, in their various modifications, the separately revolving members are held in loosely interlocked operating position. For instance:

The keeper channel or groove 3 or 3ª is shown in Figs. 1 to 4, 23, 24, 25, 26, 27, 28, 29, 30, 32, 34, 36, 37, 39, 42, 45, 50, 51, 52 and 53 as made integral with the member carrying it, while in Figs. 5 to 21, 33, 41, 44, 48 and 49 said channel is formed by separate parts, which in Figs. 8, 21, 33, 41, 44 and 49 are shown permanently fastened to the member carrying them, while in Figs. 5 to 7 and 9 to 20 and 48, it is detachably connected.

The auxiliary floating tread F is shown in Figs. 1 and 2, and 5 to 46 as a highway tread member mounted on a railway wheel R, while in Figs. 3 and 4 and 47, 48 and 49, it is shown as a railway wheel tread mounted on a highway wheel.

In Fig. 50, two floating tread members F, one a railway and the other a highway, are shown mounted on a wheel center C having two-spaced webs W. Obviously, these treads may be interchanged, or two of one kind may be used.

In Fig. 51, a wheel center C is shown which carries a floating railway tread member F, which member may be interchanged with a floating highway member F shown in Fig. 52.

In Fig. 53, the wheel center C is shown carrying a floating highway tread member F equipped with a pneumatic tire, and with which may be interchanged the floating railway tread member F shown in Fig. 54.

In the embodiment illustrated in Figs. 1 and 2, the railway wheel R is equipped with the usual tread 1 indicated in some of the other figures by T, having the standard wheel flange 2 along one side edge thereof, which flange co-acts with a groove 3 formed in the inner face of a floating tread member F, here shown as a highway tread. This tread F, at its bottom where its contacts with the highway, is shown with the flange 2 resting in the groove 3 in operative position for service on the highway. The dotted line position shown in Fig. 1, represents the position of the wheel R with reference to the rail r preparatory to the application or removal of the floating tread member. Two dotted line positions of the tread are shown, one in which the upper part of the tread is tilted in at the top to the point where the groove 3 is over the wheel flange, while the other position shows the tread to be edged-in under the wheel flange a little more at the bottom than at the top. Either of these positions may be followed in placing the floating highway tread in position to drop the wheel flange into the groove, as well as in removing the floating tread from the wheel.

In Figs. 3 and 4, a highway wheel H is shown with a tread 1ª fitting into a channel or groove 3ª formed on the inner face of a standard flanged railway tire or tread F. Two positions assumed by this tire F during the application to the highway wheel are shown in dotted lines in Fig. 3, a section of the track rail r being also shown in a location to represent the relative raised position of the wheel H with reference to the track rail during the application or removal of the floating track member F. In Fig. 4 the wheel H and floating tread member F are shown ready for service in their operating position on the track rail r.

In the form shown in Fig. 5, the railway wheel R has an extension 4 projecting laterally from the wheel rim beyond the normal tread width. An inclined face of this projection forms one of the slanting sides 5 of the annular groove 6 which receives the floating highway tread member F. The other side of the groove is formed by a flange 7 of a retaining disc 8 which is clamped against the under side of the wheel rim projection, thus forming a groove substantially V-shaped in cross-section and corresponding to the hollow triangular cross-sectional shape of the floating highway tread member F. The retaining disc 8 has a hub 9 provided with an internal left-hand thread to engage similar threads formed around the outside of a clamping nut 10, which nut in turn is provided with an internal right-hand thread to engage similar threads around the wheel hub 11. This threading arrangement provides a double throw or travel to the nut and disk in the process of application and removal. The clamping nut 10 is preferably provided with a squared end for the reception of a wrench, and a key 12 extends through the nut to engage the wheel hub, thereby locking it against rotation relative to the wheel. A similar key 13 locks the disk against rotation on the nut. In this form of the invention, one side-wall of the groove 6 is detachable from the wheel to provide for the removal and application of the floating tread member F. In designs of this character it will be noted that the smallest internal diameter of the triangular floating tread member F is less than the over-all diameter of the edge of the groove. Obviously, the internal diameter of the floating tread member F may be made larger than the diameter of the edge of the groove so that, for usual service conditions, the floating member may be removed and applied without the necessity of disturbing the retaining disc, clamping nuts, etc., which latter would then only be used for occasional adjustment and renewal of the parts.

The floating tread member F shown in Fig. 6 has a tread 14, wedge-shaped in cross-section and equipped with a solid rubber tire 15. The under inclined face 16 of the floating member F engages a portion of the coned-face or tread T of the railway wheel R, which face 17 of said tread forms one side of the groove which confines the floating member to its operating position. The other side of the groove is provided by the vertical face 18 of a retaining disc 19, which takes the thrust of the floating member under load and holds it tightly against vibration and looseness due to its frictional bearing all the way around the vertical outer face of the floating tread member. This floating member F hugs the face 18, due to its seating on the conical tread face 17 which slants toward face 18. The retaining disk 19 has a hub 20 internally threaded around the hub of the wheel R, and is locked in its operating position by a clamping ring 21 also threaded around the wheel hub and acting as a jam-nut.

The embodiment illustrated in Fig. 7 shows a floating highway tread F consisting of a simple ring adapted to slip over the tread T of the wheel R and take its rolling bearing around the coned working or wearing face 22 of the tread T. The type of wheel illustrated in this figure is one in which the originally coned and the worn hollow tread of the railway wheel forms the bottom bearing face of an annular channel or groove 23 which confines the floating tread to its operating position. The wheel flange 2ª forms one side wall of this channel or groove, and a retaining disk 24 the other side wall. The disc 24 is clamped tightly against the outer face of the wheel rim by means of a centrally located washer 25 and nut 26 threaded around a projection 27 of the wheel hub.

In this form of the invention, as also in that shown in Figs. 5 and 6, the internal diameter of the floating tread F is such that the retaining disc must be detached in removing and replacing F, and it is obvious that it must also be detached for service on railway tracks on account of the retaining disc extending beyond the coned tread of the railway wheel. However, this form may be modified so that it is not necessary to detach the retaining disc or ring. This is accomplished by providing the floating tread F with an integral annular retaining flange or lip 28, which extends beyond and around the outer corner of the wheel tread as is shown clearly in Fig. 6. By this means the outer edge of the groove may be kept within the plane of the conical tread of the wheel R, and the inside diameter of the retaining flange or lip 28 may be such as will provide for its slipping over the edge of a fixed retaining ring 29 shown in Fig. 8.

In Figs. 9 to 20 are shown a number of different forms of the type illustrated in Fig. 7, the railway wheel rim, the floating highway member and a portion of the clamping structure only being shown in these various figures. New and worn contours of the wheel tread T are shown in each figure, the full line showing the new tread and the dotted line the worn tread, together with the various positions of the floating highway tread F relative to the new and worn contours T. The dotted line positions of the floating highway tread member F shows it engaging the worn tread of the railway wheel and also shows its relative position at a point in their circumference directly under the wheel, while the full line position of the floating tread F engaging the new coned tread contour, indicates the simultaneous relative position over the wheel, of the floating tread and the worn contour, in which position there is a substantial space or clearance between the wheel tread and the floating highway member. The two positions of the floating tread shown in each figure, one in dotted and the other in full lines, also may be taken to represent the two limits in the many positions which the floating member assumes under the wheel, from the time the railway wheel has a new coned tread until it becomes sufficiently hollow-worn to require returning to restore contour.

In these various forms of the invention, as in Figs. 6 and 7, the floating tread member F rolls loosely around and bears at a point directly under the wheel on the working tread face of the railway wheel R. In this operation, the various tread members are caused to crowd to one side or the other of the annular channel or groove formed by the wheel flange and the retaining member, owing to the various shapes of the bearing faces of the floating members, rolling around and co-acting with the many wheel tread and flange contours which in turn vary from the original normal lines to the irregular bearing faces caused by hollow-worn tread and sharp flange. The retaining members shown in these figures may be of the detachable type, or they may be permanently fixed to the wheel when their edges are brought within the plane of the coned tread as explained in connection with Fig. 7.

In Figs. 9, 10, 11 and 12, four slightly different forms of floating treads F are shown, having substantially the same over-all sectional contour as well as similarly located edges to contact with the wheel flange f and the retainers 30, 31, 32 and 33 respectively.

In the form shown in Fig. 9, the floating tread member F is made in the form of a hollow rim 40, the lower wall 41 of which is slightly wedge-shaped or inclined to engage the coned face of the tread T of wheel R. The retaining plate 30 has a rib 30ª which bears against the outer face of the wheel rim when applied. This plate extends upwardly beyond the rail engaging face of said tread and engages an edge of the floating member F, whereby said member is securely held between the plate and the flange f of the wheel tread T.

The floating tread F shown in Fig. 10 is shown in the form of two parallel superposed plates 42 and 43, spaced apart and connected by a shank or neck portion 44. The inner plate 43 is narrower than the outer and is designed to rest on the tread T between the flange f and the retaining plate 31.

In Figs. 11 and 12, the floating members F are made in the form of a channel-shaped rims or holders 45 and 46 respectively. These holders carry a solid rubber tire 47, an abrasion or tread ring 48 being shown in Fig. 12 arranged around the outside of the rubber cushion member 47. In these forms of the invention in which the loose tread or floating member has a slightly wedge-shaped cross-section, this loose tread may be entered on the wheel with its thicker edge first, after the railway tread has become hollow worn. This reversed position is shown in dotted lines in Figs. 12 and 20.

In Fig. 13, the floating tread member F is made in the form of a narrow ring 49 having an annular channel 50 on its inner face midway of its width. This ring is held in position by the wheel flange f and by an inturned lip 51 of a retaining plate 52.

In the form illustrated in Fig. 14, the floating tread member F comprises a flat ring 53 having an annular rib-like projection 54 on its under face, forming a narrow contact face for engagement with the wheel tread adjacent the side opposite to the flanged side of said tread. This rib 54 contacts with a portion of the tread which is least subjected to wear, thereby affording the least variation in the position of the floating tread F as the wheel wears down. This rib contact also causes a more even wear of the wheel tread. The ring 53 is held in operative position on the tread T by means of a clamping disc or plate 55, which extends slightly beyond the outer face of said tread and engages the outer face of rib 54.

In the form shown in Fig. 15, the floating thread F is made substantially T-shaped in cross-section, with the shank 56 thereof curved laterally and rounded at its tread-engaging face, as shown at 57. This design affords a rolling engagement around the portion of the tread T least subject to wear on the flanged side of the tread. The shank or bearing portion 56 of the member F is also shaped to bear against the tip of the wheel flange f as the wheel wears down, as is shown clearly in dotted lines in Fig. 15. Wear at the root of the flange f causes serious flange breakage, and hence it is undesirable to have the floating tread contact with the wheel thread at this point. The member F is held in operative position by a retainer 58, which has a hooked portion 59 to extend around the wheel rim and over the thread T to engage the shank 56 of the member F, whereby said shank is held between the retainer and the flange f.

In the form shown in Fig. 16, the tread F comprises two separate floating highway tread members 60 and 61 which are substantially T-shaped in cross-section, with the shanks or flanges 62 and 63 thereof inclined in opposite directions and with their edges abutting and resting on the railway tread T. The edges of the tread portion of these members 60 and 61 also are shown abutting or in close proximity to form a continuous tread surface. These members 60 and 61 have the same cross-section, and one is placed in the tread in reverse position from the other. They are held in operative position by an additional floating ring 64, shown triangular in cross-section. This ring in turn, is held in operative position on the tread T by a retaining disc 65. The ring 64 engages the outer face of the shank 62 of member 60, while the outer face of the shank 63 of member 61 engages the track flange f of the railway wheel, thereby holding the floating tread members F in operative position against accidental disengagement from the wheel R.

In Fig. 17, the floating tread F comprises two differently shaped co-acting floating members 66 and 67, the cross-sectional contours of which differ from those shown in Fig. 16. The shanks 68 and 69 of floating members shown in Fig. 17 are in the middle and to one side respectively of their tread widths. The tread width of these dual members 66 and 67 as well as of the dual members shown in Fig. 16, is each made substantially equal to the width of normal tires; so that variations in the position of their outer faces, due to worn railway treads, will not result in extreme unit pressure on the highway or paved street. A retaining plate or disc 70 engages the outer face of the rib 68 of member 66, while the rib or flange 69 of the member 67 engages the flange f of the railway wheel R, and thus holds the two members of floating tread F in operative position.

In the form shown in Fig. 18, the floating tread member F is somewhat similar to that shown in Fig. 10, except that it seats only adjacent to the edge of the railway tread T which is opposed to the flanged edge thereof. A retaining flange 71 extends outwardly and around the outer edge of the railway wheel rim. This flange 71 is engaged below or within the annular plane of the wheel tread by a retaining ring 72, which ring therefore, may remain in place when the vehicle goes into railway service; since it is flush with or extends only slightly above the rail engaging face of said wheel.

In Fig. 19, the floating tread member F comprises two superposed members 73 and 74, the outer member 73 having a flange 75 extending toward the wheel hub and projecting from the underside of said outer member at its outer edge. The inner or under co-acting floating ring 74 is designed to slide laterally to form a support for the other member 73, the position of said member 74 being determined by the shape of the railway wheel tread T. A retaining ring 76 overlaps the flange 75 of the member 73 and holds the floating tread member in operative position.

In the form shown in Fig. 20, the floating highway tread F includes a steel outer tire 77 slightly wedge-shaped in cross-section and provided at its side edges with inturned flanges 78 and 79, in order better to carry on its under face a cushion member 80 of solid live-rubber or other resilient material. This cushion is designed to contact directly with the railway wheel tread, and it assumes a rolling contact around the railway tread in a manner similar to the forms shown in the other figures. A retaining plate 81 holds the member 77 in operative position on the tread T and this plate is held in a constant position against the outer under corner of the wheel rim, which is not affected by wear.

In Fig. 21, the floating tread member F is constructed in the form of a hollow steel outer tire 82 and slightly wedge-shape in cross-section, the inner face 83 of which takes its rolling bearing on a portion of the conical tread T of the wheel R. A retaining flange 84 extends radially inward from the inner face of the member 82 and is designed to engage the inner face of a flange 85 of a retaining ring 86 secured to the wheel web. The edge of the flange 84 is toothed as is shown clearly in Fig. 22 and the teeth are designed to engage a series of pins 87 arranged at intervals around the outer face of the wheel rim, and which operate to prevent the floating member from slipping around the railway member.

The form shown in Fig. 23 comprises a floating member F substantially T-shaped in cross-section, the free edge of its web 88 being enlarged into a head 89 to provide a face to co-act with the bottom of an integrally formed groove 90 in the wheel R, said groove being located at one side of the tread T. By this arrangement of the groove and the cooperating head of the floating tread member, the floating member stands entirely free from the wearing faces of the wheel tread.

In the form shown in Figs. 24 and 25, the floating highway tread member F includes a web 91 provided at its inner edge with an inturned flange 92. This flange engages an annular flange 93 which extends inwardly from the under side of the rim of the wheel R. The loosely floating relation of this highway tread F and the wheel R is the same as in the other figures, except that the bearing and the interlocking of the annular projections and co-acting grooves takes place around the circumference above the wheel center rather than below it.

In Figs. 26 and 27, the floating tread member F has a web 94 equipped at its inner edge with a head 95 inverted U-shaped in cross-section to provide a seat to receive a co-acting flange 96, which projects laterally from the web of the wheel R and is turned outwardly to seat in said head. The tread F in this form is shown provided with a solid rubber tire 97, although obviously, any other tread surface may be used.

In the form shown in Fig. 28, the railway wheel R is provided with an annular series of integral laterally extending projections 98 arranged around the wheel rim at the side opposite to that which carries the flange $f$. These projections provide a V-shaped groove 99 to receive a rim 100 of the tread member F. This rim 100 is substantially triangular in cross-section to fit the groove 99, and is shown equipped with a pneumatic tire 101.

In Fig. 29, the floating member F is made I-shaped in cross-section, and its inner flanges $102^a$ form a slanting or conical face 102 on their under sides, which face is designed to slip over and engage a cooperating conical face 103 formed around an annular flange 104 projecting laterally from and made integral with the wheel web. The inward thrust of the floating member F under load retains and prevents it from coming off, as well as holds it tight and free from vibration, due to the large annular frictional or sliding contact between the web of the floating member and the outer face of the wheel rim.

The form shown in Figs. 30 and 31 includes a floating highway member F carrying a solid rubber tire 105, the under side of its rim 106 being inclined transversely and engaging a portion of the tread T of the wheel R. This floating member F has a deep radially extending retaining flange 107 forming a web which reaches to the wheel hub, where it slips over an extension 108 of the hub and engages behind a collar 109 integral with this extension. This collar 109 performs the same function as the outer rim of the groove shown in the other figures, in retaining the floating member F in operative position.

In the form shown in Fig. 32, the under face of the rim 110 of the floating tread member F has its roller bearing or contact around the outer edge of the tread T of the wheel R. A short retaining flange 111 is carried by the rim 110 projecting from the under face thereof. This flange 111 is designed to engage a groove 112 formed in the circumference of the wheel R at the outer side of its rim opposite to that which carries the rail flange $f$ and beyond the normal tread width. The under face of the rim 110 is inclined from its edges inwardly toward the flange 111 and when in operative position, one of these inclined faces bears on the conical tread T of the wheel R, whereby the retaining flange 111 is thrown against the outer face of the groove 112, thus holding the parts tight and free from vibration. This outer face of the groove 112 may be reinforced against wear by hardened inserts shown at 113.

In Fig. 33, the tread T of the wheel R is substantially the same as that shown in Fig. 32, except that the groove $112^a$ has its outer wall formed by a separate ring or bracket 114 which is fastened to the wheel by any suitable means. This attached ring or bracket may be in the form of a continuous ring, or may comprise separate brackets spaced at intervals around the wheel.

In the form shown in Figs. 34 and 35, the railway wheel R has a groove 115 formed just outside of the normal tread width of the wheel R, an integral projection 116 being provided to accommodate the groove similar to Fig. 32. The floating tread member F shown in this figure has a hollow web 117 which is substantially truncated V-shaped in cross-section, and the apex 118 thereof is designed to be seated in the groove 115 and to contact with the cylindrical bottom of said groove.

In Fig. 36 a slightly modified form of groove $115^a$ is shown. This groove $115^a$ has the bottom or bearing face thereof slightly tapered or coned so that the floating member will hug the inner face of the groove, instead of riding free on the flat bottom as in the form shown in Fig. 34. In these designs as illustrated by Figs. 34, 35 and 36, as well as in Figs. 23, 24, 26 and 29, the floating member F stands entirely free from the wearing surface of the railway tread. This is also true of designs as shown in Figs. 37, 42 and 45. In most of the other designs illustrated, the normal or worn railway tread is a factor in determining the position and the thrust of the floating highway tread F.

In the form shown in Figs. 37 and 38, the shape of the floating tread F is similar to those shown in Figs. 34, 35 and 36, except that in this form the bottom and sides of its bearing in the groove are curved. The construction of F differs, in that it consists largely of solid rubber having a thin outer protecting steel tire 119 and an inner steel holder or abrasion ring 120.

In the form shown in Figs. 39 and 40, the wheel R is provided with a wide rim extension 121, in the outer face of which is formed a substantially V-shaped groove 122 which is located beyond the normal tread width of the wheel. This groove has a gradually sloping inner wall 123, which forms the greater portion of the bottom of the groove, while the outer face or wall 124 thereof is relatively steep or abrupt, thus forming a retaining flange 125. In this form of the invention, the floating tread F stands free from the wearing faces of the wheel tread, and as shown, has a hollow annular rib 126 on its inner face to conform to the shape of the groove 122, the rib being slightly deeper than the groove. It is of course understood that the tread face of the member F may be of any desired construction, it being here shown in the form of twin tires 127 of rubber or other suitable material.

In the form shown in Fig. 41, the tread T of the wheel R is substantially the same as that shown in Fig. 39, except that the outer wall of the groove 122, instead of being formed by an integral flange, is formed by a plate 128 riveted or otherwise secured to the wheel.

In the form shown in Figs. 42 and 43, the floating highway member F is made of sheet metal with the rim portion 129 thereof made hollow to insure lightness. The web portion 130 of this member F is made substantially L-shaped in cross-section, and is designed to enter a correspondingly shaped groove or seat 131 projecting outwardly from the outer face of the rim of the wheel R, one wall of the groove being formed by the outer face of the rim, and the other wall by said projecting seat 132. The action of the co-acting members in this form of the invention under load, is similar to that described in the forms shown in Figs. 29 and 36.

In Fig. 44, the groove 131, instead of being formed by an integral extension of the wheel rim as in Fig. 42, is formed by an attached plate 133 riveted or otherwise secured to the wheel R. This attached plate may be in the form or forms described for Fig. 33.

A railway wheel R is shown in Figs. 45 and 46 having a laterally extending rim-projection 134, which forms, beyond the normal tread width, an annular groove 135, said projection providing a bearing 136 outside of said groove, for engagement by the floating tread member F, the groove operating to separate this bearing from the tread T of the wheel. As shown, the tread member F is made hollow and carries on its inner face an engaging member 137 which is U-shaped in cross-section, one of the flanges 138 of which enters the groove 135, while the other flange 139 extends over the outer edge of the bearing 136, and operates to retain the member F in operative position. The co-acting contact faces 136 between the wheel R and the floating member F have cross-ribs 139$^a$ carried by one member and cooperating grooves 140 carried by the other member, the ribs and grooves interlocking to prevent slipping of the contacting faces. This anti-slipping provision is used when more positive action is needed than is provided by the smooth annular frictional contacting faces indicated in other figures.

In the forms shown in Figs. 47, 48 and 49, the wheel is equipped with a fixed highway tread H, instead of the flanged railway tread shown in all of the other figures except Figs. 2 and 3. The floating member F carries the railway tread in the designs indicated in Figs. 47, 48 and 49. This interchanging of the treads does not however change the relative action of the floating member and the wheel from that described in the other forms of the invention having the reverse arrangement.

In Fig. 47, the under face of the floating member F has a web Y-shaped in cross-section secured thereto and having inclined members 141 and 142. One of the inclined flanges 142 contacts with a beveled edge 143 of the rim of the wheel H, while the vertical flange 144 of the Y-shaped web engages the inner face of a retaining ring 145 which projects radially from a threaded sleeve 146 threaded around the hub 147 of the wheel H. This retaining ring 145 is locked in position by an annular ring 148 also threaded around the hub and which operates as a jam-nut, being equipped with handles 149 for actuating it.

In Fig. 48, the design shown is similar to that illustrated in Fig. 5, except that the tread members are in reverse order; that is, the floating member F in Fig. 48 is in the form of a railway tread, while the body of the wheel carries a fixed highway tread. The clamping arrangement shown in Fig. 48 is very simple, being in the form of a disk 150 extending to the wheel hub and provided with flanges at its periphery which form an inclined clamping plate 151, which in turn contacts with the under face of the wheel rim and projects beyond the upper beveled face 152 of said rim to form therewith a V-shaped groove to receive a correspondingly shaped rib 153 carried by the floating member F.

The form shown in Fig. 49 is similar to that illustrated in Fig. 48, except that the groove faces are more gradually inclined, thus forming a wider and flatter groove. The outer wall of the groove in this design is permanent, and the small internal diameter of the floating member F is sufficiently large to slip over the edge of the groove. The outer wall of this groove in Fig. 49 is formed by a plate 154 riveted or otherwise secured to the wheel, and the inner face of the floating member F is shaped to correspond to the widened groove as shown at 155, in order to cause said member to be reliably held in operative position on the wheel.

In Figs. 50, 51 and 53 a wheel center C is used, on the web of which may be mounted interchangeably, any form of wheel tread desired.

The form shown in Fig. 50 includes a wheel center C having two webs W spaced apart and having their peripheries enlarged to form bearing faces or heads 156. These bearing faces or heads 156 are adapted to carry a pair of wheel treads, here shown in the form of a railway wheel tread 157 and a highway wheel tread 158, although obviously, these treads may be interchanged, or two of the same kind may be used, or a single tread may be employed, according to the width of the tire desired and the unit pressure required on the highway. As shown, the floating treads F are retained in position by internal annular ribs 159 spaced laterally apart a sufficient distance to form a seat or channel to span the bearing faces or heads 156.

The wheel center C shown in Fig. 51 has an annular rib 160 projecting radially from its hub, thus constituting its web portion, which in turn, is designed to engage an annular groove or seat 161 formed around the inner edge of the web 162 of the floating railway tread member F.

In Fig. 52, a floating highway member F is shown equipped with a pneumatic tire P. This highway member is interchangeable with the floating railway member shown in Fig. 51, the web 162ª being similar to 162 shown in Fig. 51, and equipped with a seat 161ª to engage with the rib 160 of the wheel center.

In Fig. 53, the wheel center C has a radiating web W' with an annular groove 163 around its outer edge. This groove is designed to engage the retaining flange 164 of the rim 165 of the floating highway tread member F. The floating highway member is shown equipped with a pneumatic tire P'.

In Fig. 54, a floating railway member F is shown, which is interchangeable with the floating highway member of Fig. 53, being equipped on its inner face with a rib 164ª similar to the rib 164 of Fig. 53.

In the several figures, various kinds of floating treads are shown, and obviously, any desired forms may be used in combination with the various designs of wheels and co-acting grooves. It is to be understood that the highway and railway treads are interchangeable, and that the retaining plates or flanges may be either permanently fixed or detachable, the preferred form being that in which the inner diameter of the floating tread member is greater than the outer diameter of that portion of the co-acting member with which the floating member is used, so that the floating tread may be readily applied or removed without necessitating the use of any separate fastening elements, thus permitting the change to be accomplished with great speed and ease.

With respect to that phase of my development involving the revolving of two separate treads relative to each other while in operation the present invention is a division of the subject-matter of my application for Letters Patent Serial No. 72,001, filed November 28, 1925.

Without further description, it is thought that the features and advantages of the invention will be readily apparent to those skilled in the art, and it will of course be understood that changes in the form, proportion and minor details of construction may be restored to, without departing from the spirit of the invention and scope of the claimed invention.

I claim:

1. A vehicle wheel structure having a tread member adapted to railway track and another tread member adapted to the highway, said structure also having an annular bearing face, at least one of said members adapted to have a loose rolling contact with said annular bearing face, and an integral portion of one member serving to guide said other member.

2. A vehicle wheel structure having a tread member adapted to railway track and another tread member adapted to the highway, said structure comprising a floating tread attachment adapted to have a continuously changing point of contact with said wheel structure, and an integral portion of one member serving to guide said other member.

3. A vehicle wheel structure having a tread member adapted to railway track and another tread member adapted to the highway, said structure comprising an annular bearing face, at least one of said members having a rolling contact moving continuously around said face, and an integral portion of one member serving to guide said other member.

4. A vehicle wheel structure having a tread member adapted to railway track, another tread member adapted to the highway, and an annular bearing face, at least one of said members having a bearing face substantially greater in diameter than and co-acting with said annular bearing face, and an integral portion of one member serving to guide said other member.

5. A vehicle wheel structure having a tread member adapted to railway track, another tread member adapted to the highway, and an annular bearing face adapted to carry at least one of said members in loosely floating contact, and an integral portion of one member serving to guide said other member.

6. A vehicle wheel structure having a tread member adapted to railway track, another tread member adapted to the highway, and an annular bearing face, at least one of said members comprising a loosely floating attachment having a rolling contact with said bearing face, and an integral portion of one member serving to guide said other member.

7. A vehicle wheel structure adapted to run on a railway track and on the highway, said structure comprising a member having an annular bearing face and another separate member having an annular face of substantially different diameter than said bearing face and contacting with said face, and one of said members being entirely free on one side of the wheel from lateral contact with another member.

8. A vehicle wheel structure adapted to run on a railway track and on the highway, said structure comprising a member having an annular bearing face and another member contacting with said face at one point and standing free from it around another portion of its circumference, and one of said members being entirely free on one side of the wheel from lateral contact with another member.

9. A vehicle wheel structure adapted to run on a railway track and on the highway, said structure comprising a member having an annular bearing face, and another member contacting with said face at one point and standing free from said face at a diametrically opposite point, and one member revolving in a position to the side of a central location over the other member.

10. A vehicle wheel structure adapted to run on the railway track and on the highway, and having two separate tread members, said structure comprising a member having an annular bearing face, and another separate member contacting at one point only in the circumference of said face at any given instant, and an integral portion of one member serving to guide said other member.

11. A vehicle wheel structure adapted to run on the railway track and on the highway, said structure comprising a central member and at least one separate tread member, each having a co-acting bearing face with only one common point of rolling contact around their circumferences, and an integral portion of one member serving to guide said other member.

12. A vehicle wheel adapted to run on the railway track and on the highways and comprising a central member and at least one loose floating tread member mounted thereon so as to make a different number of revolutions than said central member, and one member revolving in a position to the side of a central location over the other member.

13. A vehicle wheel adapted to run on the railway track and on the highways and comprising a central member and at least one separate tread member, each of said members having co-acting bearing faces which stand free from each other for the greater portion of their circumference, and one member revolving in a position to the side of a central location over the other member.

14. A vehicle wheel comprising a central member having a tread portion and an annular bearing face, and another separate loosely floating tread member carried by said face, and an integral portion of one member serving to guide said other member.

15. A vehicle wheel structure adapted to run on the railway track and on the highway, said structure comprising a central member and at least one separate tread member, each having co-acting bearing faces of substantially different diameters, and an integral portion of one member serving to guide said other member.

16. A vehicle wheel structure adapted to run on the railway track and on the highway, said structure comprising a central member and at least one separate tread member, one of said members having an annular groove or channel, and the other member a projection to engage said channel for a portion only of the distance around said channel, and an integral portion of one member serving to guide said other member.

17. A vehicle wheel structure adapted to run on the railway track and on the highway, said structure comprising a central member and a co-acting tread member, one of said co-acting members having an annular groove or channel, and the other a projection to engage said channel around one portion of its circumference and to stand free from said channel around another portion of its circumference, and an integral portion of one member serving to guide said other member.

18. A vehicle wheel structure adapted to run on the railway track and on the highway, said structure comprising a central member and a co-acting loosely floating tread member, said members rotating independently, one of them having an annular projection and the other an annular groove for engagement with said projection, and an integral portion of one member serving to guide said other member.

19. A vehicle wheel structure adapted to run on the railway track and on the highway, said structure comprising a central member and a co-acting tread adapted to have a different rotation than said central member, one of said members having a projection extending around it to be enclosed or engaged on two opposite sides by said other rotating member, and one member revolving in a position to the side of a central location over the other member.

20. A vehicle wheel structure adapted to run on the railway track and on the highway, said structure comprising a central member and a co-acting tread member, one of said members having a flange extending around it to be enclosed or engaged on two laterally opposite sides by annular faces of said other member, said engaging faces contacting around one portion of their circumference and standing free of each other around another portion of their circumference.

21. A vehicle wheel structure adapted to run on a railway track and on the highway, said structure comprising a central member and another member mounted thereon so as to move relatively to said central member during rotation, and an integral portion of one member serving to guide said other member.

22. A vehicle wheel structure adapted to run on a railway track and on the highway, said structure comprising a central member and a co-acting tread member adapted to move relative to said central member during rotation, and an integral portion of one member serving to guide said other member.

23. A vehicle wheel structure adapted to run on a railway track and on the highway, said structure comprising a central member and a co-acting attachment having its own rotation independent of said central member, and an integral portion of one member serving to guide said other member.

24. A vehicle wheel structure adapted to run on the railway track and on the highway, said structure comprising a central member having a tread portion, and another tread member having a portion adapted to rotate around said central member during rotation, and an integral portion of one member serving to guide said other member.

25. A vehicle wheel adapted to run on the railway track and on the highway and having two co-acting tread members adapted to move continuously relative to each other during rotation, and one of said members being free from contact with any other member adjacent to its rim portion on one side of the wheel.

26. A convertible wheel structure adapted to run on railway track and on the highway, comprising two co-acting tread members each having its own rotation independent from the other, and one of said members being free from contact with any other member adjacent to its rim portion on one side of the wheel.

27. A convertible wheel structure adapted to run on railway track and on the highway, comprising a loosely floating tread member for one kind of service co-acting with a complete wheel member adapted to the other service, one of said members being entirely free on one side of the wheel from lateral contact with the other member.

28. A convertible wheel structure comprising a flanged railway tread and a co-acting highway tread, said treads having co-acting annular bearing faces, one of said bearing faces being substantially greater in diameter than the co-acting annular bearing face of the other tread, and one of the tread members being entirely free on one side of the wheel from lateral contact with the other member.

29. A convertible wheel structure comprising two tread members, one of which is adapted to railway track and the other to the highway, one of said tread members having an annular bearing face and the other a rolling contact with said face, one member revolving in a position to the side of the central location over the other member.

30. A convertible wheel structure comprising two independently revolving tread members, one of which is adapted to railway track and the other to the highway, one of said members having a continuously changing point of contact with the other, one member revolving in a position to the side of the central location over the other member.

31. A convertible wheel structure comprising a revolving tread member adapted to railway track, and an independently revolving tread member for highways, said members having co-acting annular faces, one of said members contacting with the other for only a portion of the distance around their co-acting annular faces, one member revolving in a position to the side of the central location over the other member.

32. A convertible wheel structure comprising two tread members, one of which revolves continuously around another, one of said members being adapted to run on railway tracks and the other on the highway, an integral portion of one member serving to guide said other member.

33. A convertible wheel structure comprising two tread members, one adapted to have continuously changing points of contact with the other, one of said members being adapted to run on railway track and the other on the highway, an integral portion of one member serving to guide said other member.

34. A convertible wheel structure adapted to run on the railway and on the highway, comprising a wheel adapted to one kind of service, and an extra tread member adapted to the other service and having an annular bearing on said wheel at only one point in its circumference, an integral portion of one member serving to guide said other member.

35. A convertible wheel structure adapted to run on a railway and on a highway, comprising a wheel adapted to one kind of service and having an annular bearing face, and a loosely floating extra tread member carried by said bearing face and adapted to the other service, an integral portion of one member serving to guide said other member.

36. A convertible wheel structure adapted to run on a railway and on a highway, comprising a wheel adapted to one kind of service and having an annular bearing face, and an extra tread member adapted to the other service and having a rolling contact with said bearing face, an integral portion of one member serving to guide said other member.

37. A convertible wheel structure adapted to run on a railway and on a highway, comprising a wheel adapted to one kind of service and having an annular bearing face, and an extra tread member adapted to the other service and contacting with said face at one point and standing free from it around another portion of its circumference, an integral portion of one member serving to guide said other member.

38. A convertible wheel structure adapted to run on a railway and on a highway, comprising a wheel adapted to one kind of service and an extra loosely floating tread member for the other service carried by said wheel and adapted to make a different number of revolutions than said wheel, one member revolving in a position to the side of a central location over the other member.

39. A convertible wheel structure adapted to run on a railway and on a highway, comprising a wheel adapted to one kind of service, and a co-acting extra tread member for the other service, each of said co-acting members having annular faces of substantially different diameter to contact with each other, one member revolving in a position to the side of a central location over the other member.

40. A convertible wheel structure adapted to run on a railway and on a highway, comprising a wheel adapted to one kind of service, and a co-acting loosely floating extra tread member adapted to the other service, one of said co-acting members having an annular groove, and the other a projection adapted to engage said annular groove, an integral portion of one member serving to guide said other member.

41. A convertible wheel structure adapted to run on a railway and on a highway, comprising a wheel adapted to one kind of service, and a co-acting extra tread for the other service adapted to rotate independently from said wheel, one of said co-acting members having a projection extending around it to be enclosed or engaged on opposite sides by said other member, an integral portion of one member serving to guide said other member.

42. A convertible wheel structure adapted to run on a railway and on a highway, comprising a wheel adapted to one kind of service, and a co-acting extra tread member for the other service adapted to move relative to said wheel during rotation, one member revolving in a position to the side of a central location over the other member.

43. A convertible wheel structure adapted to run on a railway and on a highway, comprising a wheel adapted to one kind of service, and a co-acting extra tread member for the other service adapted to rotate around said wheel during its rotation, one member revolving in a position to the side of a central location over the other member.

44. A convertible wheel structure adapted to run on a railway and on a highway, comprising a wheel adapted to one kind of service, a floating ring or extra tread member adapted to the other service, a portion of said wheel rolling inside of said extra tread member, one of said members being entirely free on one side of the wheel from lateral contact with another member.

45. A convertible wheel structure adapted to run on a railway and on a highway, comprising a wheel adapted to one kind of service and having an annular bearing face, a loose ring or tread member adapted to the other service and having an annular bearing face of substantially greater diameter than said other bearing face and with which it contacts, an integral portion of one member serving to guide said other member.

46. A convertible wheel structure adapted to run on a railway and on a highway, comprising a tread member adapted to one kind of service, and a wheel adapted to the other service, said tread member contacting with said wheel for only a portion of its circumference, and standing free from the remainder of its circumference, one member revolving in a position to the side of a central location over the other member.

47. A convertible wheel structure adapted to run on a railway and on a highway, comprising a loosely floating tread member adapted to one service, and a wheel having a tightly fastened tread adapted to the other service, said floating tread member and said wheel contacting with each other around annular faces, one of which is substantially greater in diameter than the other, ne of said members being entirely free on one side of the wheel from lateral contact with another member.

48. A convertible wheel structure adapted to run on a railway and on a highway, comprising a wheel adapted to one kind of service, and a co-acting extra tread member adapted to the other service, one of said co-acting members having a projection or flange to engage an annular groove or channel in said other member for only a portion of the distance around said groove or channel, an integral portion of one member serving to guide said other member.

49. A vehicle wheel adapted to run on railway track and on the highway, and comprising an annular bearing face and a floating tread member co-acting therewith, one of said members having a keeper element, and the other a holding and guiding element having a loosely interlocking rolling engagement with said keeper element, and an integral portion of one member serving to guide said other member.

50. A vehicle wheel adapted to run on railway track and on the highway, comprising a central member and a detachable auxiliary tire member adapted to revolve loosely around said central member, said members having interengaging elements contacting with each other for a part only of their circumferences, and an integral portion of one member serving to guide said other member.

In testimony whereof I hereunto affix my signature.

SAMUEL G. THOMSON.